United States Patent
Sugawara et al.

(10) Patent No.: US 11,462,740 B2
(45) Date of Patent: Oct. 4, 2022

(54) CONDUCTIVE MATERIAL PASTE FOR ELECTROCHEMICAL DEVICE, SLURRY COMPOSITION FOR ELECTROCHEMICAL DEVICE POSITIVE ELECTRODE AND METHOD OF PRODUCING SAME, POSITIVE ELECTRODE FOR ELECTROCHEMICAL DEVICE, AND ELECTROCHEMICAL DEVICE

(71) Applicant: ZEON CORPORATION, Tokyo (JP)

(72) Inventors: Shinsuke Sugawara, Tokyo (JP); Maki Mesuda, Tokyo (JP); Tomoya Murase, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 281 days.

(21) Appl. No.: 16/765,870

(22) PCT Filed: Nov. 29, 2018

(86) PCT No.: PCT/JP2018/043894
§ 371 (c)(1),
(2) Date: May 21, 2020

(87) PCT Pub. No.: WO2019/107463
PCT Pub. Date: Jun. 6, 2019

(65) Prior Publication Data
US 2020/0365901 A1 Nov. 19, 2020

(30) Foreign Application Priority Data
Nov. 30, 2017 (JP) .............................. JP2017-230483

(51) Int. Cl.
*H01M 4/62* (2006.01)
*H01M 4/36* (2006.01)
*H01M 10/0525* (2010.01)
*H01M 4/02* (2006.01)

(52) U.S. Cl.
CPC ............ *H01M 4/624* (2013.01); *H01M 4/362* (2013.01); *H01M 10/0525* (2013.01); *H01M 2004/028* (2013.01)

(58) Field of Classification Search
CPC ................. H01M 4/362; H01M 4/624; H01M 2004/028; H01M 10/0525

USPC ......................................................... 429/212
See application file for complete search history.

(56) References Cited

U.S. PATENT DOCUMENTS

2017/0040640 A1   2/2017  Schmidt et al.
2017/0110719 A1*  4/2017  Wang ................... H01M 4/382

FOREIGN PATENT DOCUMENTS

JP   2012014920 A   1/2012
JP   2012204303 A   10/2012
WO  2013147087 A1   10/2013

OTHER PUBLICATIONS

Feb. 5, 2019, International Search Report issued in the International Patent Application No. PCT/JP2018/043894.
May 18, 2021, the Extended European Search Report issued by the European Patent Office in the corresponding European Patent Application No. 18882822.2.
Jun. 2, 2020, International Preliminary Report on Patentability issued in the International Patent Application No. PCT/JP2018/043894.

* cited by examiner

*Primary Examiner* — James M Erwin
(74) *Attorney, Agent, or Firm* — Kenja IP Law PC

(57) ABSTRACT

A conductive material paste for an electrochemical device contains a conductive material, an imidazole compound represented by the following formula (I), a binder, and an organic solvent. In formula (I), $X^1$ and $X^2$ are each hydrogen or a monovalent organic group that optionally forms a ring structure, and $X^3$ and $X^4$ are each hydrogen or an independent monovalent organic group.

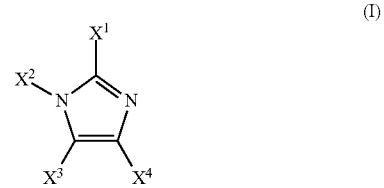

9 Claims, No Drawings

CONDUCTIVE MATERIAL PASTE FOR ELECTROCHEMICAL DEVICE, SLURRY COMPOSITION FOR ELECTROCHEMICAL DEVICE POSITIVE ELECTRODE AND METHOD OF PRODUCING SAME, POSITIVE ELECTRODE FOR ELECTROCHEMICAL DEVICE, AND ELECTROCHEMICAL DEVICE

TECHNICAL FIELD

The present disclosure relates to a conductive material paste for an electrochemical device, a slurry composition for an electrochemical device positive electrode and a method of producing the same, a positive electrode for an electrochemical device, and an electrochemical device.

BACKGROUND

Electrochemical devices such as lithium ion secondary batteries have characteristics such as compact size, light weight, high energy-density, and the ability to be repeatedly charged and discharged, and are used in a wide range of applications. Particularly in recent years, there has been focus on lithium ion secondary batteries as energy supplies for electric vehicles (EVs) and hybrid electric vehicles (HEVs), and there has been demand for even higher lithium ion secondary battery performance. Consequently, studies have been made to improve electrodes and other battery components in recent years with the aim of providing electrochemical devices such as lithium ion secondary batteries with even higher performance.

An electrode for a lithium ion secondary battery, for example, generally includes a current collector and an electrode mixed material layer formed on the current collector. An electrode mixed material layer such as a positive electrode mixed material layer, for example, is normally formed by applying, onto a current collector, a slurry composition for a positive electrode in which a positive electrode active material, a conductive material, a binder, and so forth are dispersed or dissolved in a dispersion medium, and then drying the slurry composition so as to bind the positive electrode active material, the conductive material, and so forth through the binder.

Attempts have previously been made to enhance slurry compositions for electrodes in order to achieve further improvement of electrochemical device performance. Specifically, it has been proposed that a benzimidazole-based anti-aging agent is compounded with a binder that is to be compounded in a slurry composition for an electrode (for example, refer to Patent Literature (PTL) 1).

PTL 1 proposes the inclusion of 0.05 parts by weight to 5 parts by weight of a benzimidazole-based anti-aging agent per 100 parts by mass of binder in a composition containing a binder that is a polymer having a specific chemical composition. Through such a formulation, it is possible to obtain a secondary battery having little internal degradation and long service life.

CITATION LIST

Patent Literature

PTL 1: JP 2012-14920 A

SUMMARY

Technical Problem

In recent years, there has been demand for further improvement of electrical characteristics such as low-temperature output characteristics and cycle characteristics of electrochemical devices. One means for achieving this is by forming an electrode using a slurry composition for an electrode having a high solid content concentration. However, a slurry composition for an electrode having a high solid content concentration generally tends to have a high viscosity. Consequently, increasing the solid content concentration of a slurry composition for an electrode has been problematic from a viewpoint of ensuring coatability during electrode production. Moreover, even when a benzimidazole-based anti-aging agent has been compounded in a slurry composition for an electrode as has previously been proposed, it has not been possible to sufficiently increase the solid content concentration of the slurry composition for an electrode, and, as a result, it has not been possible to produce an electrochemical device having excellent electrical characteristics.

Therefore, there is still room for improvement of the conventional technique described above in terms of increasing the solid content concentration of a slurry composition for an electrode and also further improving electrical characteristics of an obtained electrochemical device.

Accordingly, one objective of the present disclosure is to provide a conductive material paste for an electrochemical device that has a high solid content concentration and can enhance low-temperature output characteristics and cycle characteristics of an obtained electrochemical device.

Another objective of the present disclosure is to provide a slurry composition for an electrochemical device positive electrode that has a high solid content concentration and can enhance low-temperature output characteristics and cycle characteristics of an obtained electrochemical device, and also to provide a method of producing this slurry composition.

Another objective of the present disclosure is to provide a positive electrode for an electrochemical device that can enhance low-temperature output characteristics and cycle characteristics of an electrochemical device.

Another objective of the present disclosure is to provide an electrochemical device that has excellent low-temperature output characteristics and cycle characteristics.

Solution to Problem

The inventors conducted diligent investigation with the aim of solving the problems described above. The inventors reached a new finding that a conductive material paste and a slurry composition for a positive electrode having a high solid content concentration can be obtained by compounding an imidazole compound having a specific structure, and, in this manner, completed the present disclosure.

Specifically, the present disclosure aims to advantageously solve the problems set forth above by disclosing a conductive material paste for an electrochemical device comprising a conductive material, an imidazole compound, a binder, and an organic solvent, wherein the imidazole compound is an imidazole compound represented by formula (I), shown below,

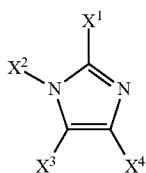

where, in formula (I), $X^1$ and $X^2$ are each hydrogen or a monovalent organic group that optionally forms a ring structure, and $X^3$ and $X^4$ are each hydrogen or an independent monovalent organic group. Compounding of an imidazole compound having the specific structure set forth above makes it possible to increase the solid content concentration of the conductive material paste and to thereby enhance low-temperature output characteristics and cycle characteristics of an obtained electrochemical device.

In the presently disclosed conductive material paste for an electrochemical device, $X^1$ to $X^4$ in formula (I) preferably do not include a heterocyclic structure. When substituents of the imidazole compound do not include a heterocyclic structure, the solid content concentration of the conductive material paste can be further increased while also better inhibiting an increase in viscosity of the conductive material paste.

In the presently disclosed conductive material paste for an electrochemical device, $X^1$ to $X^4$ in formula (I) are preferably each at least one organic group selected from hydrogen, a carboxyl group, a cyano group, an aldehyde group, a nitro group, a carboxyalkyl group, a cyanoalkyl group, an alkyl group, and an aryl group. When substituents of the imidazole compound include any of the specific groups set forth above, it is possible to further increase the solid content concentration of the conductive material paste and to thereby further enhance low-temperature output characteristics and cycle characteristics of an obtained electrochemical device.

In the presently disclosed conductive material paste for an electrochemical device, content of the imidazole compound represented by formula (I) is preferably not less than 0.03 parts by mass and not more than 1.50 parts by mass per 1.00 parts by mass of the conductive material. When the content of the imidazole compound is not less than 0.03 parts by mass and not more than 1.50 parts by mass per 1 part by mass of the conductive material, the conductive material can be well dispersed in the conductive material paste, and low-temperature output characteristics and cycle characteristics of an electrochemical device obtained using the conductive material paste can be enhanced.

In the presently disclosed conductive material paste for an electrochemical device, the conductive material may be a carbon material. The solid content concentration of a conductive material paste in which the conductive material is a carbon material can be further increased because a conductive material that is a carbon material can be well dispersed through the imidazole compound.

In the presently disclosed conductive material paste for an electrochemical device, the conductive material preferably has a specific surface area of not less than 80 $m^2/g$ and not more than 2,000 $m^2/g$. Since a conductive material having a specific surface area within the range set forth above can be well dispersed in the conductive material paste, it is possible to further improve cycle characteristics and low-temperature output characteristics of an electrochemical device obtained using the conductive material paste.

Note that the "specific surface area" of the "conductive material" referred to in the present specification is the BET specific surface area according to a nitrogen adsorption method and can be measured using a Belsorp-mini (produced by MicrotracBEL Corp.; in accordance with ASTM D3037-81), for example.

The present disclosure also aims to advantageously solve the problems set forth above by disclosing a slurry composition for an electrochemical device positive electrode comprising: a positive electrode active material; and any one of the conductive material pastes for an electrochemical device set forth above. A slurry composition for an electrochemical device positive electrode that contains any one of the conductive material pastes for an electrochemical device set forth above has a high solid content concentration and can be used to produce a positive electrode that can cause an electrochemical device to display excellent low-temperature output characteristics and cycle characteristics.

The present disclosure also aims to advantageously solve the problems set forth above by disclosing a positive electrode for an electrochemical device comprising a positive electrode mixed material layer formed using any one of the slurry compositions for an electrochemical device positive electrode set forth above. A positive electrode that includes this positive electrode mixed material layer can improve low-temperature output characteristics and cycle characteristics of an electrochemical device.

The present disclosure also aims to advantageously solve the problems set forth above by disclosing an electrochemical device comprising a positive electrode, a negative electrode, a separator, and an electrolyte solution, wherein the positive electrode is the positive electrode set forth above. An electrochemical device that includes the positive electrode set forth above has excellent low-temperature output characteristics and cycle characteristics.

The present disclosure also aims to advantageously solve the problems set forth above by disclosing a method of producing a slurry composition for an electrochemical device positive electrode comprising: a conductive material paste production step of mixing the above-described conductive material, the above-described imidazole compound represented by formula (I), a binder, and an organic solvent to obtain the above-described conductive material paste; and a slurry composition production step of adding a positive electrode active material to the conductive material paste that is obtained and mixing the positive electrode active material therewith to obtain a slurry composition. This production method enables good production of the presently disclosed slurry composition for an electrochemical device positive electrode.

Advantageous Effect

According to the present disclosure, it is possible to provide a conductive material paste for an electrochemical device that has a high solid content concentration and can enhance low-temperature output characteristics and cycle characteristics of an obtained electrochemical device.

Moreover, according to the present disclosure, it is possible to provide a slurry composition for an electrochemical device positive electrode that has a high solid content concentration and can enhance low-temperature output characteristics and cycle characteristics of an obtained electrochemical device, and also to provide a method of producing this slurry composition.

Furthermore, according to the present disclosure, it is possible to provide a positive electrode for an electrochemical device that can enhance low-temperature output characteristics and cycle characteristics of an electrochemical device.

Also, according to the present disclosure, it is possible to provide an electrochemical device that has excellent low-temperature output characteristics and cycle characteristics.

DETAILED DESCRIPTION

The following provides a detailed description of embodiments of the present disclosure.

The presently disclosed conductive material paste for an electrochemical device is used as a material in production of a slurry composition for an electrochemical device positive electrode. Moreover, the presently disclosed slurry composition for an electrochemical device positive electrode is formed using the presently disclosed conductive material paste for an electrochemical device. The presently disclosed slurry composition for an electrochemical device positive electrode can suitably be produced through the presently disclosed method of producing a slurry composition for an electrochemical device positive electrode. Furthermore, the presently disclosed positive electrode for an electrochemical device can suitably be produced using the presently disclosed slurry composition for an electrochemical device positive electrode. Also, a feature of the presently disclosed electrochemical device is that it includes the presently disclosed positive electrode for an electrochemical device.

(Conductive Material Paste for Electrochemical Device)

The presently disclosed conductive material paste is a paste that contains a conductive material, an imidazole compound, a binder, and an organic solvent. A feature of the imidazole compound contained in the presently disclosed conductive material paste is that it is an imidazole compound represented by the following formula (I) (hereinafter, also referred to as "imidazole compound (I)").

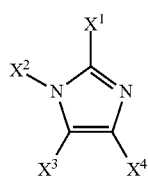

(I)

In formula (I), $X^1$ and $X^2$ are each hydrogen or a monovalent organic group that optionally forms a ring structure, and $X^3$ and $X^4$ are each hydrogen or an independent monovalent organic group.

The term "ring structure" refers to a ring structure such as an aliphatic ring, an aromatic ring, a heterocycle, or a fused ring. Moreover, when $X^3$ and $X^4$ are said to each be an "independent monovalent organic group", this means that $X^3$ and $X^4$ are not bonded to one another to form a ring structure. When $X^3$ and $X^4$ are each hydrogen or an independent monovalent organic group, the imidazole compound (I) has excellent adsorption ability with respect to the conductive material, and dispersibility of the conductive material in the conductive material paste or the like can be increased.

Conversely, $X^1$ and $X^2$ may be bonded to one another to form a ring structure. However, it is preferable that $X^1$ and $X^2$ are also independent of one another (i.e., that $X^1$ and $X^2$ are not bonded to one another to form a ring structure).

It is also preferable that $X^1$ to $X^4$ do not include a heterocyclic structure. When $X^1$ to $X^4$ do not include a heterocycle, the solid content concentration of the conductive material paste can be further increased while also better inhibiting an increase in viscosity of the conductive material paste. Moreover, even in a case in which $X^1$ to $X^4$ do include a ring structure other than a heterocyclic structure, the number of ring structures is preferably 2 or fewer, and is more preferably 1. In particular, it is preferable that $X^3$ and $X^4$ do not include a ring structure. The absence of a ring structure in $X^3$ and $X^4$ makes it harder for steric hinderance that can impede interactions with the conductive material to occur.

$X^1$ to $X^4$ are preferably each at least one organic group selected from hydrogen, a carboxyl group, a cyano group, an aldehyde group, a nitro group, a carboxyalkyl group, a cyanoalkyl group, an alkyl group, and an aryl group. Of these groups, the carboxyalkyl group, the alkyl group, and the cyanoalkyl group more preferably each have a carbon number of 1 to 12, and the aryl group more preferably has a carbon number of 6 to 12.

When $X^1$ to $X^4$ include any one of the specific groups listed above, it is possible to further increase the solid content concentration and to thereby further enhance low-temperature output characteristics and cycle characteristics of an obtained electrochemical device.

In particular, $X^1$ is preferably hydrogen, an alkyl group having a carbon number of 1 to 12, an aryl group having a carbon number of 6 to 12, or an aldehyde group, $X^2$ is preferably hydrogen, a cyanoalkyl group having a carbon number of 1 to 6, or an alkyl group having a carbon number of 1 to 12, $X^3$ is preferably hydrogen or an alkyl group having a carbon number of 1 to 12, and $X^4$ is preferably hydrogen, an alkyl group having a carbon number of 1 to 6, a carboxyl group, a cyano group, or a nitro group.

Specific examples of the imidazole compound (I) having the specific structure described above that are suitable include imidazole compounds (1) to (9) represented by general formulae (1) to (9), shown below. Imidazole compound (1) is 1-cyanoethyl-2-ethyl-4-methylimidazole, imidazole compound (2) is 1,2-dimethylimidazole, imidazole compound (3) is 4-ethylimidazole, imidazole compound (4) is 2-phenylimidazole, imidazole compound (5) is 1-cyanoethyl-2-undecylimidazole, imidazole compound (6) is 4-imidazolecarboxylic acid, imidazole compound (7) is 1H-imidazole-4-carbonitrile, imidazole compound (8) is 4-nitroimidazole, and imidazole compound (9) is imidazole-2-carboxaldehyde. Of these imidazole compounds, 1-cyanoethyl-2-ethyl-4-methylimidazole (imidazole compound (1)), 1-cyanoethyl-2-undecylimidazole (imidazole compound (5)), and 1H-imidazole-4-carbonitrile (imidazole compound (7)), which each include a cyano group, are more preferable in terms that interactions with the conductive material are stronger and dispersibility of the conductive material significantly increases.

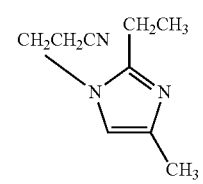

(1)

-continued

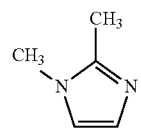
(2)

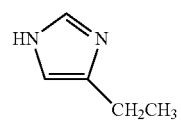
(3)

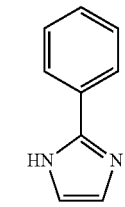
(4)

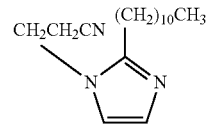
(5)

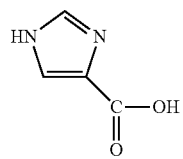
(6)

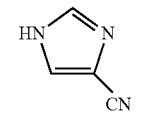
(7)

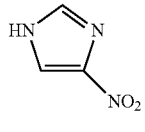
(8)

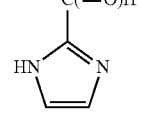
(9)

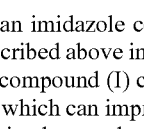

By compounding an imidazole compound (I) having the specific structure described above in the conductive material paste, the imidazole compound (I) can be adsorbed onto the conductive material, which can improve dispersibility of the conductive material in the conductive material paste and also in a slurry composition containing the conductive material paste. Consequently, it is possible to increase the concentration of solid content, inclusive of the conductive material, in the conductive material paste or slurry composition, while also inhibiting an excessive increase in viscosity of the conductive material paste or slurry composition. Therefore, in a situation in which the slurry composition is applied onto a current collector and is dried to form a positive electrode, the coating film that is dried has a high solid content concentration and has the conductive material uniformly dispersed therein. Consequently, the obtained positive electrode has conduction paths with high density and uniformity that are formed by the conductive material. Such a positive electrode has low internal resistance, and the conduction paths thereof are not easily cut off even upon repeated use. For this reason, an electrochemical device that includes this positive electrode has excellent low-temperature output characteristics and cycle characteristics.

The molecular weight of the imidazole compound (I) is preferably 5,000 or less, more preferably 2,000 or less, even more preferably 1,000 or less, and particularly preferably 500 or less. When the molecular weight of the imidazole compound is not more than any of the upper limits set forth above, there are good interactions between the imidazole compound and the conductive material, which can improve dispersibility of the conductive material in the conductive material paste and also in a slurry composition that contains the conductive material paste.

The amount of the imidazole compound (I) in the conductive material paste per 1.00 parts by mass of the subsequently described conductive material is preferably 0.03 parts by mass or more, more preferably 0.05 parts by mass or more, even more preferably 0.20 parts by mass or more, and most preferably 0.25 parts by mass or more, and is preferably 1.50 parts by mass or less, more preferably 1.00 parts by mass or less, and even more preferably 0.50 parts by mass or less. When the amount of the imidazole compound (I) is not less than any of the lower limits set forth above, the previously described effect of improving solid content concentration can be displayed to a high level, a conductive material paste having a high solid content concentration can be obtained, and, as a result, low-temperature output characteristics and cycle characteristics of an obtained electrochemical device can be enhanced. Moreover, when the amount of the imidazole compound (I) is not more than any of the upper limits set forth above, an appropriate amount of the imidazole compound (I) can be adsorbed onto the conductive material, and, as a result, excessive dispersion of the conductive material in the conductive material paste or the like can be inhibited, and the effect of improving solid content concentration can be efficiently displayed. This can also favorably inhibit conduction paths in an obtained positive electrode becoming more easily cut off and can enhance cycle characteristics and low-temperature output characteristics of an electrochemical device including the positive electrode.

<Conductive Material>

The conductive material is a material for ensuring electrical contact amongst a positive electrode active material and for enabling good formation of conduction paths inside a positive electrode mixed material layer. Examples of conductive materials that can be used include carbon materials such as carbon black (for example, acetylene black, Ketjenblack® (Ketjenblack is a registered trademark in Japan, other countries, or both), and furnace black), single-walled and multi-walled carbon nanotubes (multi-walled carbon nanotubes are inclusive of cup-stacked carbon nanotubes), carbon nanohorns, graphite, carbon fiber, carbon flake, ultra-short carbon fiber (for example, carbon nanotubes and vapor-grown carbon fiber), milled carbon fiber obtained by baking and then pulverizing polymer fiber, single-layer and multi-layer graphene, and carbon non-woven fabric sheet obtained through baking of non-woven fabric made from polymer fiber; and fibers and foils of various metals. One of these conductive materials may be used individually, or two or more of these conductive materials may be used in combination. Of these conductive materials, carbon materials are preferable, and carbon nanotubes and Ketjenblack® are more preferable from a viewpoint of further improving low-temperature output characteristics of an electrochemical device.

The specific surface area of the conductive material is preferably 80 $m^2/g$ or more, more preferably 90 $m^2/g$ or more, and even more preferably 100 $m^2/g$ or more, and is preferably 2,000 $m^2/g$ or less, more preferably 1,500 $m^2/g$ or less, and even more preferably 1,000 $m^2/g$ or less. When the specific surface area of the conductive material is not less than any of the lower limits set forth above, good conduction path formation can be promoted, and initial resistance of an obtained electrochemical device can be reduced. Moreover, when the specific surface area of the conductive material is not more than any of the upper limits set forth above, excessive adsorption to the binder can be inhibited, an increase in viscosity of the conductive material paste can be inhibited, and thus the solid content concentration of the conductive material paste can be further increased.

<Binder>

The binder is a component that, in an electrode produced by forming a positive electrode mixed material layer on a current collector using a slurry for a positive electrode that contains the presently disclosed conductive material paste, can hold components contained in the positive electrode mixed material layer so that these components do not become detached from the positive electrode mixed material layer. In general, when a binder in a positive electrode mixed material layer is immersed in electrolyte solution, the binder swells due to absorption of the electrolyte solution while binding a positive electrode active material together, binding a positive electrode active material and a conductive material together, and/or binding a conductive material together so as to prevent the positive electrode active material and the like from becoming detached from the current collector.

The binder may, without any specific limitations, be any polymer that can display binding capacity in a positive electrode mixed material layer. Examples of such polymers that can suitably be used include acrylic rubber (ACM), polyvinyl pyrrolidone (PVP), polyvinylidene fluoride (PVDF), polyacrylonitrile (PAN), and hydrogenated nitrile rubber (HNBR). One of these polymers may be used individually, or two or more of these polymers may be used as a mixture.

The amount of the binder per 1 part by mass of the conductive material is preferably 0.5 parts by mass or more, more preferably 1.0 parts by mass or more, and even more preferably 3.0 parts by mass or more, and is preferably 10.0 parts by mass or less, more preferably 6.0 parts by mass or less, and even more preferably 5.0 parts by mass or less. When the amount of the binder is within any of the ranges set forth above, it is possible to enhance low-temperature output characteristics and cycle characteristics of an electrochemical device that can be formed using the conductive material paste.

<Organic Solvent>

The organic solvent compounded in the conductive material paste may, without any specific limitations, be a polar organic solvent in which the previously described binder is soluble.

Specific examples of organic solvents that can be used include acetonitrile, N-methylpyrrolidone, acetylpyridine, cyclopentanone, N,N-dimethylacetamide, dimethylformamide, dimethyl sulfoxide, methylformamide, methyl ethyl ketone, furfural, and ethylenediamine. Of these examples, N-methylpyrrolidone (NMP) is most preferable as the organic solvent from a viewpoint of ease of handling, safety, and ease of synthesis. Note that one of these organic solvents may be used individually, or two or more of these organic solvents may be used as a mixture.

<Other Components>

Besides the components described above, components such as viscosity modifiers, reinforcing materials, antioxidants, and additives for electrolyte solution that function to inhibit electrolyte solution decomposition may be mixed into the conductive material paste. These other components can be commonly known components.

<Production Method of Conductive Material Paste>

No specific limitations are placed on the method by which the conductive material, the imidazole compound (I), the binder, the organic solvent, and the other optional components described above are mixed to produce the conductive material paste. These components may be mixed all at once or may be mixed sequentially in production of the conductive material paste. However, it is preferable that a mixture of the various materials is coarsely dispersed by stirring or the like to produce a coarse dispersion liquid and that stirred mixing of the coarse dispersion liquid is then performed using a typical mixing device such as a disper blade, a mill, or a kneader. Also note that stirred mixing may be performed over multiple stages by sequentially using a plurality of types of mixing devices. For example, a coarse dispersion liquid may be stirred by a disper blade to obtain a dispersion liquid and then the dispersion liquid may be mixed using a bead mill.

<Viscosity of Conductive Material Paste>

The viscosity of the conductive material paste measured at a temperature of 25° C. and a shear rate of 0.1 $s^{-1}$ is preferably 30,000 mPa·s or more, and more preferably 40,000 mPa·s or more, and is preferably 100,000 mPa·s or less, and more preferably 80,000 mPa·s or less. Handleability of the conductive material paste is good when the viscosity of the conductive material paste is within any of the ranges set forth above.

Note that the viscosity of the conductive material paste can be measured by a method described in the EXAMPLES section.

The viscosity of the conductive material paste can be adjusted through the amount of solvent that is added during mixing, the solid content concentration of the conductive material paste, and the type of binder.

<Solid Content Concentration of Conductive Material Paste>

The solid content concentration of the conductive material paste is preferably 5.5 mass % or more, more preferably 6.5 mass % or more, and even more preferably 7.5 mass % or more. Note that the solid content concentration of the conductive material paste is normally 50.0 mass % or less.

When the solid content concentration of the conductive material paste is not less than any of the lower limits set forth above, it is possible to produce a high-concentration slurry composition, and, as a result, the conductive material can be dispersed in high density in a positive electrode mixed material layer. Moreover, when the solid content concentration of the conductive material paste is not more than the upper limit set forth above, the conductive material can be uniformly dispersed in a positive electrode mixed material layer.

(Slurry Composition for Electrochemical Device Positive Electrode)

The presently disclosed slurry composition for an electrochemical device positive electrode contains the conductive material paste for an electrochemical device set forth above and a positive electrode active material.

A slurry composition for an electrochemical device positive electrode that contains the conductive material paste set forth above in this manner has a high solid content concentration and can be used to produce a positive electrode that can cause an electrochemical device to display excellent low-temperature output characteristics and cycle characteristics.

<Positive Electrode Active Material>

The positive electrode active material is a material that gives and receives electrons in a positive electrode of an electrochemical device. In a case in which the electrochemical device is a lithium ion secondary battery, for example, the positive electrode active material is normally a material that can occlude and release lithium.

Although the following describes, as one example, a case in which the slurry composition for an electrochemical device positive electrode is a slurry composition for a lithium ion secondary battery positive electrode, the presently disclosed slurry composition for an electrochemical device positive electrode is not limited to the following example.

The positive electrode active material of a lithium ion secondary battery may be, without any specific limitations, a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn (for example, $Li[Co_\alpha Mn_\beta Ni_\gamma]O_2$, where $\alpha+\beta+\gamma=1$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, a lithium-rich spinel compound represented by $Li_{1+x}Mn_{2-x}O_4$ (0<X<2), $Li[Ni_{0.17}Li_{0.2}Co_{0.07}Mn_{0.56}]O_2$, or $LiNi_{0.5}Mn_{1.5}O_4$. Of these positive electrode active materials, a lithium-containing complex oxide of Co—Ni—Mn ($LiNi_{0.5}Co_{0.2}Mn_{0.3}O_2$) and lithium-containing cobalt oxide ($LiCoO_2$) are preferable due to their high energy-density.

The amount and particle diameter of the positive electrode active material are not specifically limited and may be the same as those of conventionally-used positive electrode active materials.

<Other Components>

Besides the components described above, the slurry composition for an electrochemical device positive electrode may contain any of the components described as other components in the "Conductive material paste for electrochemical device" section.

Moreover, besides the components described above, the slurry composition for an electrochemical device positive electrode may contain a solvent that is optionally added during production of the slurry. Note that this additional solvent can be any of the same types of solvents as can be used in production of the conductive material paste.

<Production Method of Slurry Composition for Electrochemical Device Positive Electrode>

The presently disclosed method of producing a slurry composition for an electrochemical device positive electrode (hereinafter, also referred to simply as a "slurry composition production method") includes: a conductive material paste production step of mixing a conductive material, an imidazole compound represented by formula (I), a binder, and an organic solvent to obtain a conductive material paste; and a slurry composition production step of adding a positive electrode active material to the conductive material paste that is obtained and mixing the positive electrode active material therewith to obtain a slurry composition. This production method enables good production of the presently disclosed slurry composition.

The conductive material paste production step is in accordance with the production method described in detail in the "Production method of conductive material paste" section. The previously described positive electrode active material and, optionally, other components and additional solvent are mixed with the conductive material paste obtained through the conductive material paste production step to obtain a slurry composition for an electrochemical device positive electrode. The mixing method in this mixing is not specifically limited and may involve using a typical mixing device such as a disper blade, a mill, or a kneader. For example, in a case in which a disper blade is used, it is preferable that stirring is performed at not less than 2,000 rpm and not more than 5,000 rpm for not less than 20 minutes and not more than 60 minutes.

As a result of the positive electrode active material being added to and mixed with the conductive material paste in production of the slurry composition for an electrochemical device positive electrode after the conductive material paste has been produced, rather than being simultaneously mixed, all at once, with the conductive material and the binder, it is possible to further improve dispersibility of solid content in the slurry composition for an electrochemical device positive electrode. Moreover, the dispersion state of the conductive material is more uniform than when production is performed by mixing all of the materials at once, and differences between production batches in terms of viscosity and concentration can be limited to low levels. This facilitates production of a slurry composition for a positive electrode on an industrial scale with roughly consistent viscosity and solid content.

The viscosity of the slurry composition for an electrochemical device positive electrode at 60 rpm is preferably not less than 1,500 mPa·s and not more than 10,000 mPa·s from a viewpoint of ensuring coatability onto a current collector. Moreover, the solid content concentration of the slurry composition for an electrochemical device positive electrode is preferably 65 mass % or more, more preferably 69 mass % or more, and even more preferably 73 mass % or more. Note that the solid content concentration of the slurry composition is normally 90 mass % or less. When the solid content concentration of the slurry composition is not less than any of the lower limits set forth above, it is possible to increase the solid content concentration during drying in formation of a positive electrode mixed material layer, which enables high-density and uniform dispersion of the conductive material in the obtained positive electrode mixed material layer. Moreover, when the solid content concentration of the slurry composition is not more than the upper limit set forth above, the slurry composition has excellent coatability onto a current collector.

Note that the "viscosity of the slurry composition for an electrochemical device positive electrode at 60 rpm" can be measured in accordance with JIS Z8803:1991.

A ratio of the amount of the conductive material paste (amount in terms of solid content) and the amount of the positive electrode active material can be adjusted as appropriate. For example, the mixing ratio of the conductive material paste and the positive electrode active material can be adjusted such that, relative to 100 parts by mass of the positive electrode active material, the conductive material is compounded in a ratio of preferably 0.50 parts by mass or more, more preferably 0.65 parts by mass or more, and even more preferably 0.80 parts by mass or more, and preferably 2.00 parts by mass or less, more preferably 1.50 parts by mass or less, and even more preferably 1.20 parts by mass or less.

(Positive Electrode for Electrochemical Device)

The presently disclosed positive electrode for an electrochemical device includes a positive electrode mixed material layer formed using the presently disclosed slurry composition. Accordingly, the positive electrode mixed material layer contains at least a positive electrode active material, a conductive material, an imidazole compound (I), a binder, and other optional components.

It should be noted that components contained in the positive electrode mixed material layer are components that were contained in the slurry composition for an electrochemical device positive electrode set forth above, and the preferred ratio of these components in the positive electrode mixed material layer is also the same as the preferred ratio of the components in the slurry composition.

In the presently disclosed positive electrode for an electrochemical device, a positive electrode mixed material layer in which a conductive material is well dispersed in high density can be provided on a current collector as a result of the positive electrode mixed material layer being formed using the slurry composition for an electrochemical device positive electrode set forth above. Consequently, the presently disclosed positive electrode for an electrochemical device can improve low-temperature output characteristics and cycle characteristics of an electrochemical device that includes the positive electrode.

<Production of Positive Electrode for Electrochemical Device>

The positive electrode mixed material layer of the presently disclosed positive electrode for an electrochemical device can be formed on a current collector through a step of applying the slurry composition set forth above onto the current collector (application step) and a step of drying the slurry composition that has been applied onto the current collector to form a positive electrode mixed material layer on the current collector (drying step), for example.

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be appropriately set in accordance with the thickness of the positive electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of these materials may be used individually, or two or more of these materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like.

Through drying of the slurry composition on the current collector in this manner, a positive electrode mixed material layer can be formed on the current collector and thus a positive electrode for an electrochemical device that includes the current collector and the positive electrode mixed material layer can be obtained.

After the drying step, the positive electrode mixed material layer may be further subjected to a pressing process by mold pressing, roll pressing, or the like. The pressing process can improve close adherence between the positive electrode mixed material layer and the current collector. Furthermore, in a case in which the positive electrode mixed material layer contains a curable polymer, the polymer is preferably cured after formation of the positive electrode mixed material layer.

(Electrochemical Device)

The presently disclosed electrochemical device includes the positive electrode for an electrochemical device set forth above, a negative electrode, an electrolyte solution, and a separator. The presently disclosed electrochemical device can display excellent rate characteristics and cycle characteristics as a result of the positive electrode for an electrochemical device set forth above being used therein.

Although the following describes, as one example, a case in which the electrochemical device is a lithium ion secondary battery, the presently disclosed electrochemical device is not limited to the following example.

<Negative Electrode>

Examples of a negative electrode for an electrochemical device that can be used in the presently disclosed electrochemical device include, without any specific limitations, known negative electrodes that can be used in production of secondary batteries. For example, the negative electrode can be a negative electrode that is obtained by forming a negative electrode mixed material layer on a current collector by a known production method.

<Electrolyte Solution>

The electrolyte solution is normally an organic electrolyte solution obtained by dissolving a supporting electrolyte in an organic solvent. The supporting electrolyte of a lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Suitable examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferred for their high dielectric constant and broad stable potential region.

The concentration of the electrolyte in the electrolyte solution may be adjusted as appropriate. Furthermore, known additives may be added to the electrolyte solution.

<Separator>

The separator may be a separator such as described in JP 2012-204303 A, for example, but is not specifically limited thereto. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

The secondary battery can be produced by, for example, stacking the positive electrode and the negative electrode with the separator in-between, performing rolling, folding, or the like of the resultant stack in accordance with the battery shape as necessary to place the stack in a battery container, injecting the electrolyte solution into the battery container, and sealing the battery container. Note that the positive electrode for an electrochemical device set forth above is used in production of the presently disclosed electrochemical device. Also note that the presently disclosed electrochemical device may be provided with an overcurrent preventing device such as a fuse or a PTC device; an expanded metal; or a lead plate as necessary in order to prevent a rise in secondary battery internal pressure and the occurrence of overcharging or overdischarging. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used in the examples and comparative examples to evaluate the BET specific surface area of a conductive material, the solid content concentration of a conductive material paste, the solid content concentration of a slurry composition for a positive electrode, low-temperature output characteristics, and cycle characteristics.

<BET Specific Surface Area of Conductive Material>

The BET specific surface area of each conductive material used in the examples and comparative examples was measured using a Belsorp-mini (produced by MicrotracBEL Corp.; in accordance with ASTM D3037-81).

<Solid Content Concentration of Conductive Material Paste>

The solid content concentration of a conductive material paste obtained in each example or comparative example was evaluated for when the conductive material paste had a viscosity of 48,000 mPa·s to 52,000 mPa·s as measured at a temperature of 25° C. and a shear rate of 0.1 s$^{-1}$ using a rheometer (MCR302 produced by Anton Paar GmbH). Note that the measured conductive material paste viscosity was within a range of 48,000 mPa·s to 52,000 mPa·s in every example and comparative example.

A: Solid content concentration of 7.5 mass % or more
B: Solid content concentration of not less than 6.5 mass % and less than 7.5 mass %
C: Solid content concentration of not less than 5.5 mass % and less than 6.5 mass %
D: Solid content concentration of not less than 4.5 mass % and less than 5.5 mass %
E: Solid content concentration of less than 4.5 mass %

<Solid Content Concentration of Slurry Composition for Positive Electrode>

The solid content concentration of a slurry composition for a positive electrode obtained in each example or comparative example was evaluated for when the viscosity (JIS Z8803:1991) of the slurry composition for a positive electrode at 60 rpm in a 25° C. environment was within a range of 3,000 mPa·s to 4,000 mPa·s.

A: Solid content concentration of 73 mass % or more
B: Solid content concentration of not less than 69 mass % and less than 73 mass %
C: Solid content concentration of not less than 65 mass % and less than 69 mass %
D: Solid content concentration of not less than 61 mass % and less than 65 mass % E: Solid content concentration of less than 61 mass %

<Low-Temperature Output Characteristics>

A secondary battery produced in each example or comparative example was charged to a state of charge (SOC) of 50% at 1C in a 25° C. environment. Thereafter, the secondary battery was subjected to 15 seconds of charging and 15 seconds of discharging, centered around an SOC of 50%, at each of 0.5C, 1.0C, 1.5C, and 2.0C in a –10° C. environment. In each case (charging side and discharging side), the battery voltage after 15 seconds was plotted against a current value, and then the gradient of the plot was determined as IV resistance (s)) (IV resistance during charging and IV resistance during discharging). The obtained IV resistance value ($\Omega$) was evaluated with a value for Comparative Example 1 as a standard (100). A smaller IV resistance value indicates lower internal resistance and better low-temperature output characteristics.

A: IV resistance of less than 4%
B: IV resistance of not less than 4% and less than 4.3%
C: IV resistance of not less than 4.3% and less than 4.6%
D: IV resistance of not less than 4.6% and less than 4.9%
E: IV resistance of 4.9% or more <Cycle Characteristics>

A secondary battery produced in each example or comparative example was subjected to three cycles of an operation of charging to 4.2 V and discharging to 3.0 V at 0.2C (C is a number expressed by rated capacity (mA)/1 hr) in a 25° C. environment. Thereafter, the secondary battery was subjected to 200 cycles of an operation of charging to a battery voltage of 4.2V at 1C and discharging to a battery voltage of 3.0 V at 1C in a 45° C. environment. A capacity maintenance rate $\Delta C$ (=(C1/C0)×100(%)) was calculated from the discharge capacity (C0) of the 1$^{st}$ cycle and the discharge capacity (C1) of the 200$^{th}$ cycle and was evaluated by the following standard. A higher capacity maintenance rate indicates a smaller decrease of discharge capacity and better cycle characteristics.

A: Capacity maintenance rate $\Delta C$ of 90% or more
B: Capacity maintenance rate $\Delta C$ of not less than 88.5% and less than 90%
C: Capacity maintenance rate $\Delta C$ of not less than 87% and less than 88.5%
D: Capacity maintenance rate $\Delta C$ of less than 87%

Example 1

A lithium ion secondary battery including the presently disclosed positive electrode for an electrochemical device was produced as one example of the presently disclosed electrochemical device. The following provides a detailed description of each step.

<Production of Binder for Positive Electrode>

A reactor having an internal capacity of 10 L was charged with 100 parts of deionized water and, as monomers, 35 parts by mass of acrylonitrile and 65 parts by mass of 1,3-butadiene, and then 2 parts of potassium oleate as an emulsifier, 0.1 parts of potassium phosphate as a stabilizer, and 0.5 parts of 2,2',4,6,6'-pentamethylheptane-4-thiol (TIBM) as a molecular weight modifier were added. Emulsion polymerization was carried out at 30° C. in the presence of 0.35 parts of potassium persulfate as a polymerization initiator to copolymerize the butadiene and the acrylonitrile. Once the polymerization conversion rate reached 90%, 0.2 parts of hydroxylamine sulfate was added per 100 parts of monomer to terminate polymerization. Subsequently, the reactor was heated and residual monomer was collected through steam distillation at approximately 70° C. under reduced pressure. Thereafter, 2 parts of alkylated phenol was added as an anti-aging agent to obtain a water dispersion of a polymer.

Next, 400 mL (total solid content: 48 g) of the obtained water dispersion of the polymer was loaded into a 1 L autoclave equipped with a stirrer, and nitrogen gas was passed for 10 minutes so as to remove dissolved oxygen in the copolymer solution. Thereafter, 50 mg of palladium acetate was dissolved in 180 mL of water to which nitric acid had been added in an amount of 4 molar equivalents of the Pd and was added as a hydrogenation reaction catalyst. After purging the system twice with hydrogen gas, the contents of the autoclave were heated to 50° C. in a state of pressurization to 3 MPa (gauge pressure) with hydrogen gas, and a hydrogenation reaction was carried out for 6 hours.

Thereafter, the contents were restored to normal temperature, the system was converted to a nitrogen atmosphere, and then an evaporator was used to concentrate the contents to a solid content concentration of 40% and yield hydrogenated nitrile rubber as a binder for a positive electrode.

NMP was added to an aqueous solution having a solid content concentration of 40% of the hydrogenated nitrile rubber as a binder for a positive electrode, and then water and excess NMP were removed by vacuum distillation to obtain an NMP solution of the hydrogenated nitrile rubber having a solid content concentration of 8%.

<Production of Conductive Material Paste>

A conductive material paste was produced by adding 1 part of multi-walled carbon nanotubes (BET specific surface area: 150 m$^2$/g) as a conductive material, 4 parts (in terms of solid content) of the hydrogenated nitrile rubber obtained as a binder for a positive electrode as described above, 0.30 parts of 1-cyanoethyl-2-ethyl-4-methylimidazole (formula (1), shown below) as an imidazole compound (I), and an appropriate amount of NMP as an organic solvent, stirring these materials using a disper blade (60 minutes at 3,000 rpm), and then mixing these materials for 1 hour at a circumferential speed of 8 m/s using a bead mill in which zirconia beads of 1 mm in diameter were used. As a result of measurement using a rheometer (MCR302 produced by Anton Paar GmbH), the conductive material paste was determined to have a viscosity of 49,000 mPa·s at a temperature of 25° C. and a shear rate of 0.1 s$^{-1}$ and a solid content concentration value of 7.9 mass %.

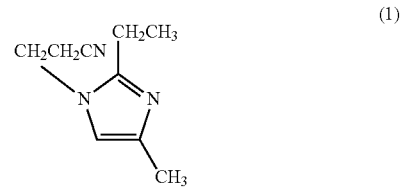

(1)

<Production of Slurry Composition for Secondary Battery Positive Electrode and Production of Positive Electrode>

A slurry composition for a lithium ion secondary battery positive electrode corresponding to the presently disclosed slurry composition for an electrochemical device positive electrode was produced by adding 100 parts of a three-component active material having a layered structure (LiNi$_{0.5}$Co$_{0.2}$Mn$_{0.3}$O$_2$; average particle diameter: 10 μm) as a positive electrode active material and an appropriate amount of NMP as an organic solvent to the conductive material paste described above, and then performing stirring thereof using a disper blade (20 minutes at 3,000 rpm). Note that the additive amount of NMP was adjusted such that the viscosity of the obtained slurry for a positive electrode at 60 rpm was within a range of 3,000 mPa·s to 4,000 mPa·s. The solid content concentration of the slurry was measured as previously described. The result is shown in Table 1.

Aluminum foil of 20 μm in thickness was prepared as a current collector. The slurry for a positive electrode obtained as described above was applied onto one side of the aluminum foil using a comma coater such as to have a coating weight of 20 mg/cm$^2$ after drying. The applied slurry was dried at 90° C. for 20 minutes and at 120° C. for 20 minutes, and was then heat-treated at 60° C. for 10 hours to obtain a positive electrode web. The positive electrode web was rolled by roll pressing to produce a sheet-shaped positive electrode including the aluminum foil and a positive electrode mixed material layer having a density of 3.2 g/cm$^3$. The sheet-shaped positive electrode was cut to 48.0 mm in width and 47 cm in length to obtain a positive electrode for a lithium ion secondary battery.

<Production of Negative Electrode for Lithium Ion Secondary Battery>

A slurry composition for a secondary battery negative electrode was produced by using a planetary mixer to stir a mixture of 90 parts of spherical artificial graphite (volume-average particle diameter: 12 μm) and 10 parts of SiO$_x$ (volume-average particle diameter: 10 μm) as a negative electrode active material, 1 part of a styrene butadiene polymer as a binder for a negative electrode, 1 part of carboxymethyl cellulose as a thickener, and an appropriate amount of water as a dispersion medium.

Copper foil of 15 μm in thickness was prepared as a current collector. The slurry composition for a secondary battery negative electrode was applied onto one side of the copper foil such as to have a coating weight of 10 mg/cm$^2$ after drying, and was dried at 60° C. for 20 minutes and at 120° C. for 20 minutes. Thereafter, 2 hours of heat treatment was performed at 150° C. to obtain a negative electrode web. The negative electrode web was rolled by roll pressing to produce a sheet-shaped negative electrode including the copper foil and a negative electrode mixed material layer having a density of 1.6 g/cm$^3$. The sheet-shaped negative electrode was cut to 50.0 mm in width and 52 cm in length to obtain a negative electrode for a lithium ion secondary battery.

<Production of Lithium Ion Secondary Battery>

The produced positive electrode for a lithium ion secondary battery and the produced negative electrode for a lithium ion secondary battery were wound using a core of 20 mm in diameter such that the electrode mixed material layers of the electrodes faced one another with a separator (microporous membrane made from polypropylene) of 15 μm in thickness interposed between the electrodes to thereby obtain a roll. The obtained roll was then compressed to a thickness of 4.5 mm from one direction at a rate of 10 mm/s. Note that the compressed roll had an elliptical shape in plan view, and the ratio of the major axis to the minor axis (major axis/minor axis) was 7.7.

An electrolyte solution ($LiPF_6$ solution of 1.0 M in concentration) was also prepared. (Note that a mixed solution obtained by adding 5 mass % of fluoroethylene carbonate to a mixed solvent of ethylene carbonate/ethyl methyl carbonate=3/7 (mass ratio) was used as a solvent and 2 volume % of vinylene carbonate was added as an additive.)

Thereafter, the compressed roll was enclosed in a laminate case made from aluminum with 3.2 g of the electrolyte solution. After connecting a nickel lead wire to a specific position of the negative electrode for a secondary battery and connecting an aluminum lead wire to a specific position of the positive electrode for a secondary battery, the opening of the case was thermally sealed to obtain a lithium ion secondary battery corresponding to the presently disclosed electrochemical device. The lithium ion secondary battery was a pouch battery of 35 mm in width, 60 mm in height, and 5 mm in thickness, and the nominal capacity of the battery was 700 mAh.

Low-temperature output characteristics and cycle characteristics of the obtained lithium ion secondary battery were evaluated. The results are shown in Table 1.

Examples 2 to 9

Various operations and evaluations were performed in the same way as in Example 1 with the exception that imidazole compounds (2) to (9) according to the following general formulae (2) to (9), which had substituents shown in Table 1, were respectively used as an imidazole compound (I). The results are shown in Table 1.

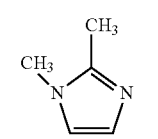
(2)

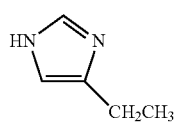
(3)

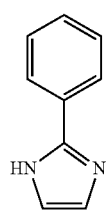
(4)

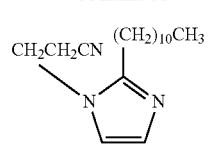
(5)

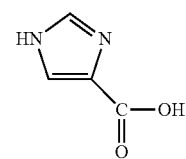
(6)

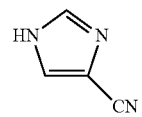
(7)

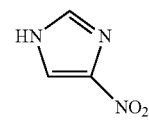
(8)

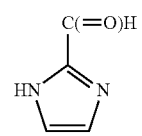
(9)

Examples 10 to 15 and 22

Various evaluations and measurements were performed in the same way as in Example 1 with the exception that the amount of 1-cyanoethyl-2-ethyl-4-methylimidazole added as an imidazole compound (I) in the "Production of conductive material paste" step was changed as shown in Table 1 or 2. The results are shown in Table 1 or 2.

Example 16

Various evaluations and measurements were performed in the same way as in Example 1 with the exception that the positive electrode active material was changed to lithium-containing cobalt oxide ($LiCoO_2$; average particle diameter: 10 μm). The results are shown in Table 2.

Example 17

Various evaluations and measurements were performed in the same way as in Example 1 with the exception that the binder for a positive electrode used in the "Production of conductive material paste" step was changed to a binder for a positive electrode produced as described below. The results are shown in Table 2.

<Production of Binder for Positive Electrode>

A reactor having an internal capacity of 10 L was charged with 374.5 parts by mass of deionized water, 0.5 parts by mass of diethanolamine, and 25 parts by mass of sodium hypophosphite, and these materials were heated to 90° C. Next, 500 parts by mass of N-vinylpyrrolidone as a monomer was added into the reactor over 180 minutes, and an initiator aqueous solution of 10 parts by mass of 2,2'-azobis-2-amidinopropane dihydrochloride as a polymerization initiator and 90 parts by mass of deionized water was added into the reactor over 210 minutes. In addition, aqueous solutions each containing 0.5 parts by mass of 2,2'-azobis-2-amidinopropane dihydrochloride and 4.5 parts by mass of deionized water were respectively added, all at once, at 210 minutes and 240 minutes after the start of addition of the polymerization initiator. Also, 8.0 parts by mass of 10 mass % malonic acid aqueous solution as a pH adjuster was added at 270 minutes after the start of addition of the polymerization initiator. The reaction was ended once at least 270 minutes had passed from the start of addition of the polymerization initiator and monomer consumption had reached 99% to yield a polyvinyl pyrrolidone aqueous solution.

NMP was added to the polyvinyl pyrrolidone aqueous solution and then water and excess NMP were removed by vacuum distillation to obtain an NMP solution of polyvinyl pyrrolidone having a solid content concentration of 8%.

An NMP solution of a binder for a positive electrode was then obtained by mixing the NMP solution of polyvinyl pyrrolidone (PVP) that was obtained as described above and an NMP solution of polyvinylidene fluoride (PVDF) that was separately produced such that the mass ratio of PVP and PVDF was 50:50.

Example 18

Various evaluations and measurements were performed in the same way as in Example 1 with the exception that the binder for a positive electrode used in the "Production of conductive material paste" step was changed to a binder for a positive electrode produced as described below. The results are shown in Table 2.
<Production of Binder for Positive Electrode>

A polymerization can A was charged with 10.75 parts of 2-ethylhexyl acrylate and 1.25 parts of acrylonitrile as monomers, 0.12 parts of sodium lauryl sulfate, and 79 parts of deionized water, then 0.2 parts of ammonium persulfate as a polymerization initiator and 10 parts of deionized water were added thereto, and these material were heated to 60° C. and were stirred for 90 minutes. Thereafter, a separate polymerization can B was charged with 66.8 parts of 2-ethylhexyl acrylate, 19.0 parts of acrylonitrile, 2.0 parts of methacrylic acid, and 0.2 parts of allyl methacrylate as monomers, 0.7 parts of sodium lauryl sulfate, and 46 parts of deionized water. These materials were stirred to produce an emulsion that was then sequentially added from the polymerization can B to the polymerization can A over approximately 180 minutes. The polymerization can A was stirred for approximately 120 minutes, and once monomer consumption reached 95%, cooling was performed to end the reaction, and then pH adjustment was performed using 4% NaOH aqueous solution to obtain a water dispersion of acrylic rubber as a binder for a positive electrode.

NMP was added to the water dispersion of the acrylic rubber obtained as described above, and then water and excess NMP were removed by vacuum distillation to obtain an NMP solution of the acrylic rubber having a solid content concentration of 8%.

Example 19

Various evaluations and measurements were performed in the same way as in Example 1 with the exception that the binder for a positive electrode used in the "Production of conductive material paste" step was changed to a binder for a positive electrode produced as described below. The results are shown in Table 2.

<Production of Binder for Positive Electrode>
A reactor A equipped with a mechanical stirrer and a condenser was charged with 85 parts of deionized water and 0.2 parts of sodium dodecylbenzenesulfonate in a nitrogen atmosphere, and was then stirred while being heated to 55° C. and while 0.3 parts of potassium persulfate was added into the reactor A in the form of a 5.0% aqueous solution. Next, a separate reactor B equipped with a mechanical stirrer was charged with 94.0 parts of acrylonitrile, 1.0 parts of acrylamide, 2.0 parts of acrylic acid, and 3.0 parts of n-butyl acrylate as monomers, 0.6 parts of sodium dodecylbenzenesulfonate, 0.035 parts of tert-dodecylmercaptan, 0.4 parts of polyoxyethylene lauryl ether, and 80 parts of deionized water in a nitrogen atmosphere, and these material were stirred and emulsified to produce a monomer mixture. The monomer mixture was added into the reactor A at a constant rate over 5 hours while in a stirred and emulsified state, and a reaction was carried out until the polymerization conversion rate reached 95% to yield a water dispersion of a polyacrylonitrile-based copolymer as a binder for a positive electrode.

NMP was added to the water dispersion of the polyacrylonitrile-based copolymer obtained as described above, and then water and excess NMP were removed by vacuum distillation to obtain an NMP solution of the polyacrylonitrile-based copolymer having a solid content concentration of 6%.

Example 20

Various evaluations and measurements were performed in the same way as in Example 1 with the exception that the binder for a positive electrode used in the "Production of conductive material paste" step was changed to polyvinylidene fluoride. The results are shown in Table 2.

Example 21

Various evaluations and measurements were performed in the same way as in Example 1 with the exception that the conductive material used in the "Production of conductive material paste" step was changed to Ketjenblack (BET specific surface area: 800 m²/g). The results are shown in Table 2.

Comparative Example 1

Various evaluations and measurements were performed in the same way as in Example 1 with the exception that 1-ethyl-3-methylimidazolium chloride (formula (10), shown below), which is an imidazolium salt that does not include the prescribed structure, was used instead of the imidazole compound (I) that was added in the "Production of conductive material paste" step. The results are shown in Table 2.

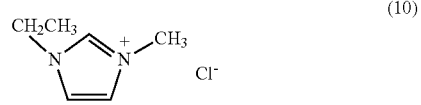

Comparative Example 2

Various evaluations and measurements were performed in the same way as in Example 1 with the exception that an imidazole compound (I) was not added in the "Production of conductive material paste" step. The results are shown in Table 2.

Comparative Example 3

Various evaluations and measurements were performed in the same way as in Example 1 with the exception that benzimidazole (formula (11), shown below), which is an imidazole compound that does not have the prescribed structure, was used instead of the imidazole compound (I) that was added in the "Production of conductive material paste" step. The results are shown in Table 2.

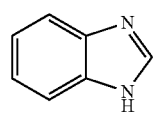
(11)

In Tables 1 and 2, substituents of the imidazole compounds are shown in correspondence with $X^0$ to $X^4$ denoted in the following general formula (α).

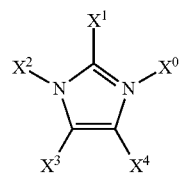
(α)

Moreover, in Tables 1 and 2:

"NMC532" indicates $LiNi_{0.5}Co_{0.2}Mn_{0.3}O_2$;

"MWCNT" indicates multi-walled carbon nanotubes;

"HNBR" indicates hydrogenated nitrile rubber;

"NMP" indicates N-methylpyrrolidone;

"LCO" indicates $LiCoO_2$;

"PVP" indicates polyvinyl pyrrolidone;

"PVDF" indicates polyvinylidene fluoride;

"ACM" indicates acrylic rubber;

"PAN" indicates polyacrylonitrile-based copolymer;

"KB" indicates Ketjenblack;

"CEEMI" indicates 1-cyanoethyl-2-ethyl-4-methylimidazole;

"DME" indicates 1,2-dimethylimidazole;

"EI" indicates 4-ethylimidazole;

"PI" indicates 2-phenylimidazole;

"CEUI" indicates 1-cyanoethyl-2-undecylimidazole;

"IC" indicates 4-imidazolecarboxylic acid;

"ICN" indicates 1H-imidazole-4-carbonitrile;

"NI" indicates 4-nitroimidazole;

"ICA" indicates imidazole-2-carboxaldehyde;

"EMICl" indicates 1-ethyl-3-methylimidazolium chloride; and

"BI" indicates benzimidazole.

TABLE 1

| | | | | Examples | | | | | | |
|---|---|---|---|---|---|---|---|---|---|---|
| | | | | 1 | 2 | 3 | 4 | 5 | 6 | 7 |
| Slurry composition for electrochemical device positive electrode | Positive electrode active material | Type | | NMC532 | NMC532 | NMC532 | NMC532 | NMC532 | NMC532 | NMC532 |
| | | Amount (parts by mass) | | 100 | 100 | 100 | 100 | 100 | 100 | 100 |
| | Conductive material | Type | | MWCNT | MWCNT | MWCNT | MWCNT | MWCNT | MWCNT | MWCNT |
| | | Specific surface area (m²/g) | | 150 | 150 | 150 | 150 | 150 | 150 | 150 |
| | | Amount (parts by mass) | | 1 | 1 | 1 | 1 | 1 | 1 | 1 |
| | Imidazole compound | Type | | CEEMI | DME | EI | PI | CEUI | IC | ICN |
| | | Amount (parts by mass) | | 0.30 | 0.30 | 0.30 | 0.30 | 0.30 | 0.30 | 0.30 |
| | | Substituents | $X^1$ | Ethyl | Methyl | Hydrogen | Phenyl | Undecyl | Hydrogen | Hydrogen |
| | | | $X^2$ | Cyanoethyl | Methyl | Hydrogen | Hydrogen | Cyanoethyl | Hydrogen | Hydrogen |
| | | | $X^3$ | Hydrogen | Hydrogen | Hydrogen | Hydrogen | Hydrogen | Hydrogen | Hydrogen |
| | | | $X^4$ | Methyl | Hydrogen | Ethyl | Hydrogen | Hydrogen | Carboxyl | Cyano |
| | | | $X^0$ | — | — | — | — | — | — | — |
| | | Molecular formula | | $C_9H_{13}N_3$ | $C_5H_8N_2$ | $C_5H_8N_2$ | $C_9H_8N_2$ | $C_{17}H_{29}N_3$ | $C_4H_4N_2O_2$ | $C_4H_3N_3$ |
| | | Molecular weight (—) | | 163.22 | 96.13 | 96.13 | 144.17 | 275.44 | 112.09 | 93.09 |
| | Binder | Type | | HNBR | HNBR | HNBR | HNBR | HNBR | HNBR | HNBR |
| | | Amount (parts by mass) | | 4 | 4 | 4 | 4 | 4 | 4 | 4 |
| | Organic solvent | Type | | NMP | NMP | NMP | NMP | NMP | NMP | NMP |
| Evaluation | | Conductive material paste solid content concentration | | A | A | A | A | A | A | A |
| | | Slurry composition solid content concentration | | A | A | A | A | A | A | A |

TABLE 1-continued

|  |  |  | Examples | | | | | | |
|---|---|---|---|---|---|---|---|---|---|
|  | Low-temperature output characteristics |  | A | A | A | A | A | A | A |
|  | Cycle characteristics |  | A | A | A | A | A | A | A |

|  |  |  | Examples | | | | | |
|---|---|---|---|---|---|---|---|---|
|  |  |  | 8 | 9 | 10 | 11 | 12 | 13 |
| Slurry composition for electrochemical device positive electrode | Positive electrode active material | Type | NMC532 | NMC532 | NMC532 | NMC532 | NMC532 | NMC532 |
|  |  | Amount (parts by mass) | 100 | 100 | 100 | 100 | 100 | 100 |
|  | Conductive material | Type | MWCNT | MWCNT | MWCNT | MWCNT | MWCNT | MWCNT |
|  |  | Specific surface area ($m^2/g$) | 150 | 150 | 150 | 150 | 150 | 150 |
|  |  | Amount (parts by mass) | 1 | 1 | 1 | 1 | 1 | 1 |
|  | Imidazole compound | Type | NI | ICA | CEEMI | CEEMI | CEEMI | CEEMI |
|  |  | Amount (parts by mass) | 0.30 | 0.30 | 0.22 | 0.10 | 0.03 | 1.00 |
|  |  | Substituents $X^1$ | Hydrogen | Aldehyde | Ethyl | Ethyl | Ethyl | Ethyl |
|  |  | $X^2$ | Hydrogen | Hydrogen | Cyanoethyl | Cyanoethyl | Cyanoethyl | Cyanoethyl |
|  |  | $X^3$ | Hydrogen | Hydrogen | Hydrogen | Hydrogen | Hydrogen | Hydrogen |
|  |  | $X^4$ | Nitro | Hydrogen | Methyl | Methyl | Methyl | Methyl |
|  |  | $X^0$ | — | — | — | — | — | — |
|  |  | Molecular formula | $C_3H_3N_3O_2$ | $C_4H_4N_2O$ | $C_9H_{13}N_3$ | $C_9H_{13}N_3$ | $C_9H_{13}N_3$ | $C_9H_{13}N_3$ |
|  |  | Molecular weight (—) | 113.07 | 96.09 | 163.22 | 163.22 | 163.22 | 163.22 |
|  | Binder | Type | HNBR | HNBR | HNBR | HNBR | HNBR | HNBR |
|  |  | Amount (parts by mass) | 4 | 4 | 4 | 4 | 4 | 4 |
|  | Organic solvent | Type | NMP | NMP | NMP | NMP | NMP | NMP |
| Evaluation | Conductive material paste solid content concentration |  | A | A | C | C | C | A |
|  | Slurry composition solid content concentration |  | A | A | C | C | C | A |
|  | Low-temperature output characteristics |  | A | A | B | B | C | B |
|  | Cycle characteristics |  | A | A | B | C | C | C |

TABLE 2

|  |  |  | Examples | | | | | |
|---|---|---|---|---|---|---|---|---|
|  |  |  | 14 | 15 | 16 | 17 | 18 | 19 |
| Slurry composition for electrochemical device positive electrode | Positive electrode active material | Type | NMC532 | NMC532 | LCO | NMC532 | NMC532 | NMC532 |
|  |  | Amount (parts by mass) | 100 | 100 | 100 | 100 | 100 | 100 |
|  | Conductive material | Type | MWCNT | MWCNT | MWCNT | MWCNT | MWCNT | MWCNT |
|  |  | Specific surface area ($m^2/g$) | 150 | 150 | 150 | 150 | 150 | 150 |
|  |  | Amount (parts by mass) | 1 | 1 | 1 | 1 | 1 | 1 |
|  | Imidazole compound | Type | CEEMI | CEEMI | CEEMI | CEEMI | CEEMI | CEEMI |
|  |  | Amount (parts by mass) | 1.50 | 0.70 | 0.30 | 0.30 | 0.30 | 0.30 |
|  |  | Substituents $X^1$ | Ethyl | Ethyl | Ethyl | Ethyl | Ethyl | Ethyl |
|  |  | $X^2$ | Cyanoethyl | Cyanoethyl | Cyanoethyl | Cyanoethyl | Cyanoethyl | Cyanoethyl |
|  |  | $X^3$ | Hydrogen | Hydrogen | Hydrogen | Hydrogen | Hydrogen | Hydrogen |
|  |  | $X^4$ | Methyl | Methyl | Methyl | Methyl | Methyl | Methyl |
|  |  | $X^0$ | — | — | — | — | — | — |
|  |  | Molecular formula | $C_9H_{13}N_3$ | $C_9H_{13}N_3$ | $C_9H_{13}N_3$ | $C_9H_{13}N_3$ | $C_9H_{13}N_3$ | $C_9H_{13}N_3$ |
|  |  | Molecular weight (—) | 163.22 | 163.22 | 163.22 | 163.22 | 163.22 | 163.22 |
|  | Binder | Type | HNBR | HNBR | HNBR | PVP:PVDF (50:50) | ACM | PAN |
|  |  | Amount (parts by mass) | 4 | 4 | 4 | 4 | 4 | 4 |
|  | Organic solvent | Type | NMP | NMP | NMP | NMP | NMP | NMP |
| Evaluation | Conductive material paste solid content concentration |  | A | A | A | A | A | A |
|  | Slurry composition solid content concentration |  | A | A | A | A | A | A |

TABLE 2-continued

|  |  |  | | | | | | |
|---|---|---|---|---|---|---|---|---|
| | Low-temperature output characteristics | | C | B | A | A | A | A |
| | Cycle characteristics | | C | B | A | A | A | A |

| | | | Examples | | | Comparative examples | | |
|---|---|---|---|---|---|---|---|---|
| | | | 20 | 21 | 22 | 1 | 2 | 3 |
| Slurry composition for electrochemical device positive electrode | Positive electrode active material | Type | NMC532 | NMC532 | NMC532 | NMC532 | NMC532 | NMC532 |
| | | Amount (parts by mass) | 100 | 100 | 100 | 100 | 100 | 100 |
| | Conductive material | Type | MWCNT | KB | MWCNT | MWCNT | MWCNT | MWCNT |
| | | Specific surface area ($m^2/g$) | 150 | 800 | 150 | 150 | 150 | 150 |
| | | Amount (parts by mass) | 1 | 1 | 1 | 1 | 1 | 1 |
| | Imidazole compound | Type | CEEMI | CEEMI | CEEMI | EMICI | None | BI |
| | | Amount (parts by mass) | 0.30 | 0.30 | 0.45 | 0.30 | — | 0.30 |
| | | Substituents $X^1$ | Ethyl | Ethyl | Ethyl | Hydrogen | — | Hydrogen |
| | | $X^2$ | Cyanoethyl | Cyanoethyl | Cyanoethyl | Ethyl | — | Hydrogen |
| | | $X^3$ | Hydrogen | Hydrogen | Hydrogen | Hydrogen | — | Not independent |
| | | $X^4$ | Methyl | Methyl | Methyl | Hydrogen | — | Not independent |
| | | $X^0$ | — | — | — | Methyl | — | — |
| | | Molecular formula | $C_9H_{13}N_3$ | $C_9H_{13}N_3$ | $C_9H_{13}N_3$ | $C_6H_{11}ClN_2$ | — | $C_7H_6N_2$ |
| | | Molecular weight (—) | 163.22 | 163.22 | 163.22 | 146.62 | — | 118.14 |
| | Binder | Type | PVDF | HNBR | HNBR | HNBR | HNBR | HNBR |
| | | Amount (parts by mass) | 4 | 4 | 4 | 4 | 4 | 4 |
| | Organic solvent | Type | NMP | NMP | NMP | NMP | NMP | NMP |
| Evaluation | Conductive material paste solid content concentration | | A | A | A | E | E | E |
| | Slurry composition solid content concentration | | A | A | A | E | E | E |
| | Low-temperature output characteristics | | A | A | A | E | E | E |
| | Cycle characteristics | | A | A | A | D | D | D |

It can be seen from Examples 1 to 22 in Tables 1 and 2 that through compounding of an imidazole compound having a specific structure, a conductive material paste and a slurry composition having a high solid content concentration can be obtained, and, as a result, a secondary battery having enhanced low-temperature output characteristics and cycle characteristics can be obtained.

It can also be seen that in Comparative Example 1 in which 1-ethyl-3-methylimidazolium chloride, which has a methyl group bonded at the $X^0$ position in general formula (α), was used and in Comparative Example 3 in which benzimidazole, for which $X^3$ and $X^4$ in general formula (α) are not independent of one another and form a ring structure, was used, a conductive material paste and a slurry composition having a high solid content concentration could not be obtained, and, as a result, a secondary battery having enhanced low-temperature output characteristics and cycle characteristics could not be obtained. Moreover, it can be seen that a conductive material paste and a slurry composition having a high solid content concentration could not be obtained, and, as a result, a secondary battery having enhanced low-temperature output characteristics and cycle characteristics could not be obtained in Comparative Example 2 in which an imidazole compound was not used.

INDUSTRIAL APPLICABILITY

According to the present disclosure, it is possible to provide a conductive material paste for an electrochemical device that has a high solid content concentration and can enhance low-temperature output characteristics and cycle characteristics of an obtained electrochemical device.

Moreover, according to the present disclosure, it is possible to provide a slurry composition for an electrochemical device positive electrode that has a high solid content concentration and can enhance low-temperature output characteristics and cycle characteristics of an obtained electrochemical device, and also to provide a method of producing this slurry composition.

Furthermore, according to the present disclosure, it is possible to provide a positive electrode for an electrochemical device that can enhance low-temperature output characteristics and cycle characteristics of an electrochemical device.

Also, according to the present disclosure, it is possible to provide an electrochemical device that has excellent low-temperature output characteristics and cycle characteristics.

The invention claimed is:

1. A conductive material paste for an electrochemical device comprising a conductive material, an imidazole compound, a binder, and an organic solvent, wherein
   the imidazole compound is an imidazole compound represented by formula (I), shown below,

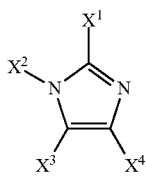

where, in formula (I), $X^1$ and $X^2$ are each hydrogen or a monovalent organic group that optionally forms a ring structure, and $X^3$ and $X^4$ are each hydrogen or an independent monovalent organic group; and content of the imidazole compound represented by formula (I) is not less than 0.03 parts by mass and not more than 1.50 parts by mass per 1.00 parts by mass of the conductive material.

2. The conductive material pastes for an electrochemical device according to claim 1, wherein $X^1$ to $X^4$ in formula (I) do not include a heterocyclic structure.

3. The conductive material pastes for an electrochemical device according to claim 1, wherein $X^1$ to $X^4$ in formula (I) are each at least one organic group selected from hydrogen, a carboxyl group, a cyano group, an aldehyde group, a nitro group, a carboxyalkyl group, a cyanoalkyl group, an alkyl group, and an aryl group.

4. The conductive material pastes for an electrochemical device according to claim 1, wherein the conductive material is a carbon material.

5. The conductive material pastes for an electrochemical device according to claim 1, wherein the conductive material has a specific surface area of not less than 80 $m^2/g$ and not more than 2,000 $m^2/g$.

6. A slurry composition for an electrochemical device positive electrode comprising: a positive electrode active material; and the conductive material paste for an electrochemical device according to claim 1.

7. A positive electrode for an electrochemical device comprising a positive electrode mixed material layer formed using the slurry composition for an electrochemical device positive electrode according to claim 6.

8. An electrochemical device comprising a positive electrode, a negative electrode, a separator, and an electrolyte solution, wherein the positive electrode is the positive electrode for an electrochemical device according to claim 7.

9. A method of producing the slurry composition for an electrochemical device positive electrode according to claim 6, comprising:

a conductive material paste production step of mixing the conductive material, the imidazole compound represented by formula (I), the binder, and the organic solvent to obtain the conductive material paste; and a slurry composition production step of adding the positive electrode active material to the conductive material paste that is obtained and mixing the positive electrode active material therewith to obtain a slurry composition.

* * * * *